(12) United States Patent
Curle (10) Patent No.: US 8,425,160 B2
(45) Date of Patent: Apr. 23, 2013

(54) DRILL CUTTINGS STORAGE AND CONVEYING

(76) Inventor: William Curle, Glasgow (GB)

( * ) Notice: Subject to any disclaimer, the term of this patent is extended or adjusted under 35 U.S.C. 154(b) by 17 days.

(21) Appl. No.: 12/067,701

(22) PCT Filed: Sep. 22, 2006

(86) PCT No.: PCT/GB2006/003548
§ 371 (c)(1),
(2), (4) Date: Dec. 17, 2008

(87) PCT Pub. No.: WO2007/034215
PCT Pub. Date: Mar. 29, 2007

(65) Prior Publication Data
US 2009/0220324 A1    Sep. 3, 2009

(30) Foreign Application Priority Data
Sep. 23, 2005 (GB) .................... 0519450.1

(51) Int. Cl.
*B65G 53/40* (2006.01)
(52) U.S. Cl.
USPC ............ 406/123; 406/85; 406/119; 406/127; 175/207; 166/162
(58) Field of Classification Search ............... 406/122, 406/123, 85, 119, 127; 175/208; 166/162
See application file for complete search history.

(56) References Cited

U.S. PATENT DOCUMENTS

| | | | | |
|---|---|---|---|---|
| 305,976 A * | 9/1884 | Smith | | 406/120 |
| 634,775 A * | 10/1899 | Suderman et al. | | 406/123 |
| 1,618,395 A * | 2/1927 | Ward | | 406/120 |
| 1,815,403 A * | 7/1931 | Goebels | | 406/120 |
| 1,943,780 A * | 1/1934 | Allen | | 406/128 |
| 2,214,736 A * | 9/1940 | Carmichael et al. | | 406/120 |
| 3,050,342 A * | 8/1962 | Koranda et al. | | 406/120 |
| 3,069,207 A * | 12/1962 | Borger et al. | | 406/119 |
| 3,088,777 A * | 5/1963 | Aller | | 406/119 |
| 3,088,778 A * | 5/1963 | Aller | | 406/119 |
| 3,105,721 A * | 10/1963 | Collins et al. | | 406/39 |
| 3,167,359 A * | 1/1965 | Aller | | 406/31 |
| 3,182,954 A * | 5/1965 | Borger | | 406/130 |
| 3,207,560 A * | 9/1965 | Brown | | 406/120 |
| 3,306,671 A * | 2/1967 | Leeman | | 406/123 |
| 3,490,813 A * | 1/1970 | Hallstrom | | 406/130 |
| 3,809,436 A * | 5/1974 | Ciaffone | | 406/48 |
| 3,863,811 A * | 2/1975 | Fisher et al. | | 222/145.1 |
| T983010 I4 * | 6/1979 | Adler | | 406/123 |
| 4,381,897 A * | 5/1983 | Arbeletche et al. | | 406/93 |

(Continued)

FOREIGN PATENT DOCUMENTS

| GB | 1365919 | 9/1974 |
|---|---|---|
| GB | 2145052 | 4/1984 |

*Primary Examiner* — Joseph A Dillon, Jr.
(74) *Attorney, Agent, or Firm* — Dickinson Wright PLLC (57) ABSTRACT

A drill cuttings storage and conveying system is disclosed herein. The system includes a pressure vessel for containing drill cuttings and comprising a plurality of drill cuttings outlets. The system also includes a drill cuttings conveyor in communication with the outlets for carrying drill cuttings from the vessel. In an inventive method for practicing the invention, drill cuttings are passed into the pressure vessel having the plurality of outlets. The vessel is pressurized. A selected outlet is opened such that a volume of drill cuttings passes from the vessel to the conveyor. The drill cuttings with the conveyor from the outlet.

1 Claim, 9 Drawing Sheets

U.S. PATENT DOCUMENTS

| | | | |
|---|---|---|---|
| 4,453,866 A * | 6/1984 | Ryan | 406/70 |
| 4,529,336 A * | 7/1985 | Shinozaki et al. | 406/14 |
| 5,618,136 A | 4/1997 | Smoot | |
| 5,775,852 A * | 7/1998 | Boutte et al. | 406/32 |
| 6,709,217 B1 | 3/2004 | Snowdon | |
| 6,988,567 B2 * | 1/2006 | Burnett et al. | 175/66 |
| 7,195,084 B2 * | 3/2007 | Burnett et al. | 175/66 |
| 7,493,969 B2 * | 2/2009 | Burnett et al. | 175/88 |
| 2006/0102390 A1 * | 5/2006 | Burnett et al. | 175/66 |
| 2007/0215386 A1 * | 9/2007 | Burnett et al. | 175/66 |
| 2008/0196942 A1 * | 8/2008 | Bingham et al. | 175/46 |
| 2010/0316472 A1 * | 12/2010 | Hilgraf et al. | 414/296 |
| 2011/0162838 A1 * | 7/2011 | Mackenzie et al. | 166/267 |

* cited by examiner

Section A-A

DRILL CUTTINGS STORAGE AND CONVEYING

FIELD OF THE INVENTION

This invention relates to a system for storing and conveying drill cuttings and other materials, particularly heavy pastes or sludges.

BACKGROUND OF THE INVENTION

Drill cuttings are a by-product of drilling deep bores, such as are required by the oil and gas exploration and production industry to access hydrocarbon reservoirs. The drill cuttings are separated from the drilling fluid or mud used to carry the cuttings to surface and are then stored at the drilling location. At intervals the cuttings are collected and transported for treatment and disposal.

Conventionally, in offshore drilling operations, drill cuttings are stored in portable containers or skips. The filled skips are moved by crane between the drilling rig and a supply boat used to transport the cuttings to shore for treatment and disposal. However, operators would prefer to avoid the large number of crane movements necessary to move any volume of drill cuttings, the operation having health and safety implications and being vulnerable to disruption due to adverse weather conditions.

Other methods of storing and conveying drill cuttings have been proposed, as described in WO 00/76889. This document describes the use of a pressure vessel including a conical hopper portion. The cone angle of the hopper portion is selected to be less than a critical value required to achieve mass flow, which is described as the material descending as a mass in a uniform way towards the outlet with all the material moving. When compressed gas is applied to the drill cuttings in the vessel, the material flows out of the vessel.

SUMMARY OF THE INVENTION

According to the present invention there is provided a drill cuttings storage and conveying system comprising:

a pressure vessel for containing drill cuttings and comprising a plurality of drill cuttings outlets; and a drill cuttings conveyor in communication with the outlets for carrying drill cuttings from the vessel.

According to another aspect of the invention there is provided a method of storing and conveying drill cuttings, the method comprising:

passing drill cuttings into a pressure vessel having a plurality of outlets;

pressurizing the vessel;

opening a selected outlet such that a volume of drill cuttings passes from the vessel to a conveyor; and transporting the drill cuttings from the outlet.

Providing the pressure vessel with a plurality of outlets offers a number of advantages, one being that a blockage in one outlet does not prevent material being removed from the vessel; it is still possible to remove a significant proportion of the drill cuttings from the vessel through the one or more other outlets. Removing the bulk of the stored material through the other outlets may facilitate removal of the blockage without manual intervention. Also, where the vessel has, for example, six outlets, the system may still function relatively efficiently when one outlet is blocked, such that an operation to clear the blockage may be postponed until the work on the system will not delay or disrupt other operations.

The provision of multiple outlets also facilitates removal of drill cuttings from the vessel in a manner which reduces, minimizes or avoids "rat-holing", that is the formation of passages in the cuttings leading to the outlets, such that the material surrounding the passage does not tend to move towards the outlet and remains in the vessel, and it is only possible to clear this material from the vessel with manual intervention.

Preferably, each outlet is provided at the bottom of a guide portion for directing the cuttings towards the outlet. The guide portion may have a conical, frusto-conical, pyramidal or polygonal form. Preferably, the guide portions are hexagonal.

One or more conveyors may be provided, and in a preferred embodiment two conveyor conduits are provided for communication with the outlets, which conduits may subsequently merge. Preferably, each conveyor conduit communicates with a plurality of outlets. The conveyors may take any appropriate form and may comprise cylindrical piping or tubing. The tubing may be of any appropriate diameter, for example 100 mm, 125 mm or 150 mm. The tubing may be rigid or flexible, and may comprise a combination of rigid and flexible sections. The length of the conveyor may vary depending on application, and will typically be between 10 m and 250 m.

The outlets may be aligned such that two or more outlets may communicate with a single, substantially straight conveyor conduit passing directly beneath the aligned outlets. This avoids or minimizes the requirement to provide bends in the conveyor, facilitating movement of cuttings along the conveyor. Of course the conveyor may include bends and may include vertical rises and falls.

Preferably, the conveyor operates pneumatically, most preferably utilizing compressed air to move the cuttings along the conveyor. The capacity of the system may depend on the compressed air supply available at the site. Typically, the system will operate with a system providing 700 to 1000 cfm at 6 to 8 bar (gauge).

Preferably, the outlets are provided in a base member and a volume below the base member is adapted to be pressurized, to assist in supporting the base member to resist the fluid pressure force created within the cuttings storage portion of the vessel. Preferably, the base member extends across a lower portion of the vessel and defines a chamber within the pressure vessel. A pressure balance conduit may provide communication between the underside of the base member and the cuttings storage portion of the vessel.

Preferably, the vessel base member comprises a plurality of agitation fluid outlets, such that fluid, typically air, may be directed into the cuttings adjacent the base member to agitate and break-up the cuttings and facilitate cuttings removal through the outlets.

The outlets may be provided with valves for selectively opening and closing the outlets. Each outlet may be provided with a respective valve, or a group of two or more valves may be provided with a respective valve. The valves may take any appropriate form, and may be slide valves.

Preferably, one outlet is opened at a time, and the outlet may be opened and closed in sequence, for example opened for 5 to 15 seconds and then closed for 5 to 30 seconds. This mode of operation results in discrete volumes or slugs of cuttings passing through the outlet to the conveyor. This facilitates movement of the cuttings along the conveyor, and of course will have utility in single outlet vessels, and vessels which may or may not be pressurized. The opening and closing sequence of the outlets may be controlled by any appropriate means, but is typically achieved through use of timer-controlled valves at the outlets. In other embodiments, more sophisticated controls may be provided. Furthermore, where conveyor capacity is sufficient, two or more outlets may be open at any one time. Alternatively, or in addition, air may be supplied to a selected group of agitation fluid outlets associated with a selected outlet to facilitate flow of cuttings from the outlet. In other embodiments, a group of open outlets may communicate with a conveyor, and the air flow through the conveyor in communication with the outlets may be controlled to create slugs of material.

Preferably, the system comprises a compressor which may supply pressurized air to pressurize the vessel above the cuttings, supply air to the agitation fluid outlets, and supply air to the conveyor. The air supplied to the agitation fluid outlets will be at higher pressure than the air utilized to pressurize the vessel, which in turn is higher than the pressure of the air supplied to the conveyor. The bulk of the air from the compressor is preferably directed to the conveyor. Airflow from the compressor manifold to the various elements of the system may be balanced using any appropriate means, typically orifice plates.

The pressure vessel may take a cylindrical form. The main axis of the cylinder may be vertical or horizontal. A vertical cylinder facilitates provision of a system with a smaller footprint, useful in applications where deck space is restricted. A horizontal cylinder facilitates provision of a more stable, lower height system, and is thus useful in systems which are adapted to be transported, for example by road, rail or sea. Pressure vessels, such as those adapted for mounting on trailers for road or rail transport, may be provided without conveyors, compressors and the like, which may only be provided at transfer depots and the like.

The pressure vessel may be adapted for shipping or transport, for example the pressure vessel may be mounted within an appropriate frame, such as an ISO frame. This facilitates shipping and handling of the system as an assembled or part-assembled unit. Thus, fabrication and assembly of the system may be carried out at a convenient location, the assembled system may be shipped as a unit, and commissioning of the system may be carried out quickly and easily on site. The pressure vessel may be adapted for shipping or transport while filled with drill cuttings. A plurality of pressure vessels may be provided on a sea-going vessel for bulk transport of drill cuttings. The system may be adapted for mounting on or in the deck or hold of an existing barge, or a barge may incorporate one or more systems.

The system may be wholly fluid actuated and operated, for example all valves and switches may be pneumatic. This facilitates operation of the system in areas where flammable gases may be present. The use of pneumatic actuation also facilitates local repair and maintenance.

The system may be adapted to be operated and controlled from a local control panel.

The pressure vessel may be mounted, in use, on a load cell or other mass-measuring device. By monitoring the load cell it is thus possible to identify the mass of cuttings within the pressure vessel both easily and quickly.

The volume of the pressure vessel may be selected to suit particular circumstances, and the system may be readily scaled up or down. A pressure vessel intended for use on an off-shore facility may have a cubic capacity of 16 m, whereas a barge-mounted pressure vessel may have a volume of 40 m. A pressure vessel intended for use in batch transfer will typically have a volume between 100 and 1000 liters.

Aspects of the present invention additionally relate to a pressure vessel, and to a conveyor, as described above, provided independently. Furthermore, various ones of the above preferred and alternative features may also have utility independently of the aspects of the invention identified above. For example, agitation fluid outlets may be utilized in single outlet vessels, as may the intermittent outlet opening method for supplying cuttings to the conveyor.

Although the system and method are described above with reference to storing and conveying drill cuttings, those of skill in the art will recognize that the invention has utility in relation to other materials, and in particular to other thick, heavy paste or sludge-type materials.

BRIEF DESCRIPTION OF THE DRAWINGS

These and other aspects of the present invention will now be described, by way of example, with reference to the accompanying drawings, in which.

DETAILED DESCRIPTION OF THE EXEMPLARY EMBODIMENT

FIGS. 1 to 5 of the drawings illustrate a system 10 for storing and conveying drill cuttings in accordance with an embodiment of the present invention. The system 10 comprises a pressure vessel 12 for containing the cuttings and a conveyor 14 for transporting the cuttings from the vessel 12. The system 10 may be provided on a drilling rig for storing drill cuttings produced in the course of drilling operations, and then for conveying the drill cuttings to a supply boat for transporting the cuttings to another location for treatment and disposal, or for re-injection.

The vessel 12 has a base member 16 defining an inverted cone 18 surrounded by six outlet cones 20 at 60° centers. Each outlet cone 20 comprises an outlet opening 22, which is normally closed by a respective slide valve 23. The outlet cones 20 are arranged in two groups of three, with the outlet openings 22 of each group aligned with a respective conveyor conduit 24, 26 which extends beneath the openings 22. The conduits 24, 26 subsequently merge into a single conduit 28.

Figure 1:
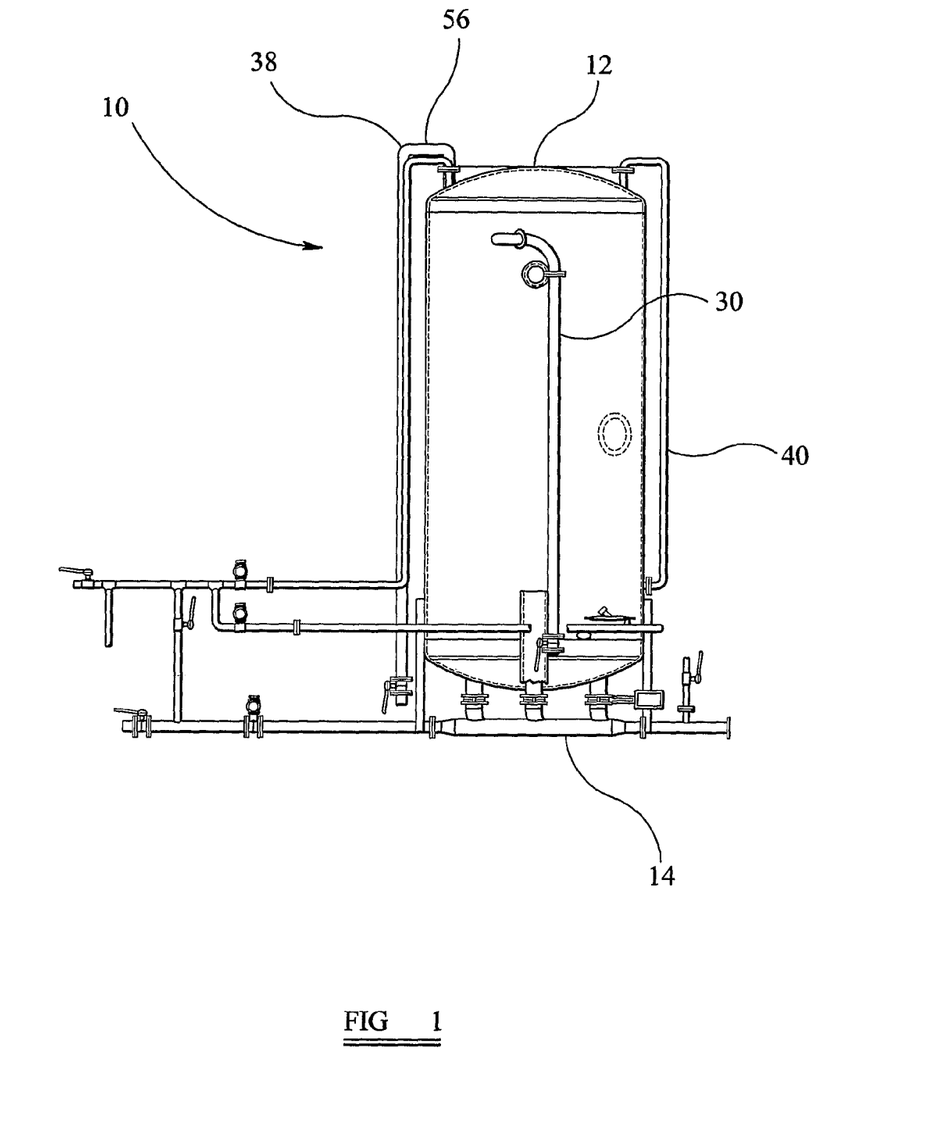
FIG. 1 is an elevation of a drill cuttings storage and conveying system in accordance with an embodiment of the present invention.

Various conduits connect with the upper end portion of the vessel 12, including a fill line 30 which extends into the upper portion of the vessel 12 and is used to fill the vessel with cuttings. A vent line 38 is provided to allow air to vent selectively from the vessel 12, and a compressed air line 56 allows the upper volume of the vessel to be connected to a compressor, as will be described.

Figure 2:
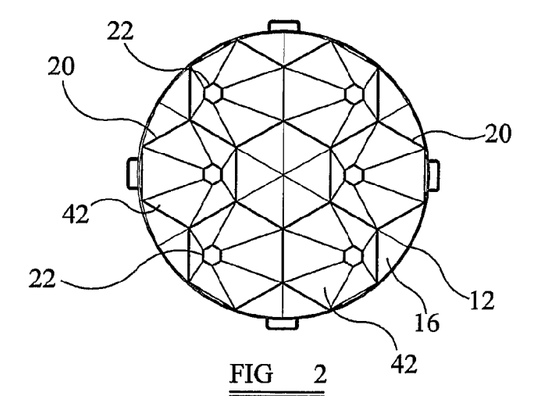
FIG. 2 is an enlarged sectional view of FIG. 1 showing the base member of the pressure vessel of the system of FIG. 1.

To facilitate the support of the base member 16, a pressure balance line 40 extends from the upper portion of the vessel 12 to a volume 39 below the base 16, which volume 39 is within the pressure vessel 12. This avoids the need for the base member 16 to resist the pressure used to urge the cuttings from the vessel 12, although the member must of course be sufficiently robust to support the mass of cuttings stored in the vessel 12.

Figures 3, 4:
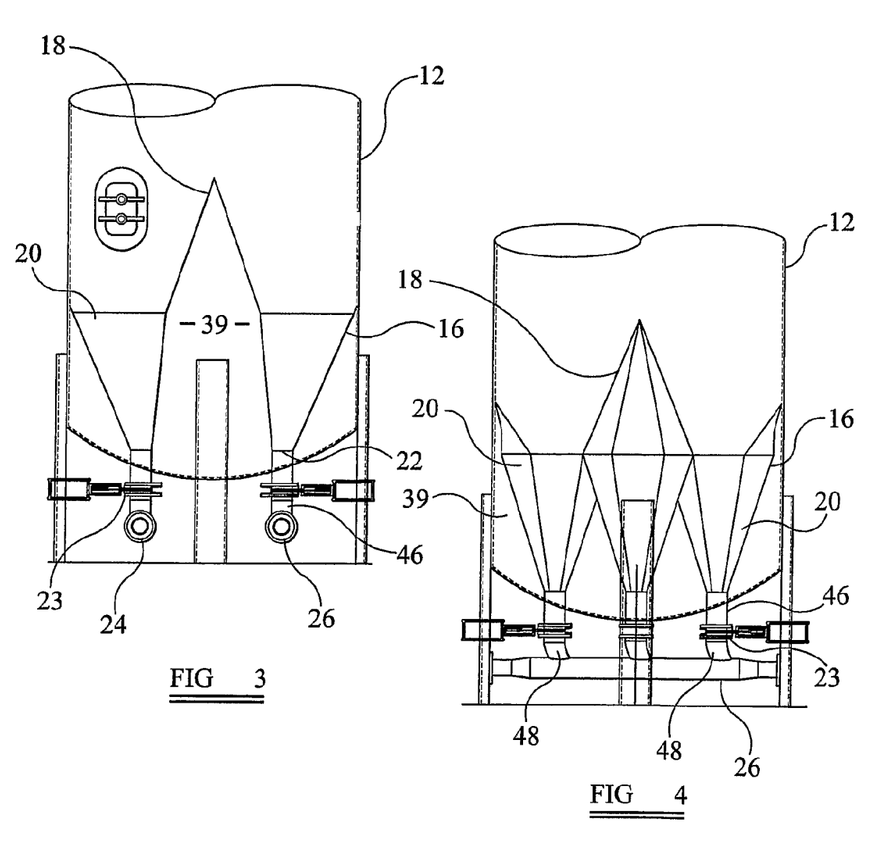
FIGS. 3 and 4 are elevations of the base of the pressure vessel of the system of FIG. 1 showing selected hidden detail.

The base member 16 is formed of sections of welded metal sheet, and each outlet cone 20 comprises six trapezoidal wall sections 42. However, the wall sections 42 are of different forms and thus the cones 20 are of irregular hexagonal form, and some of the wall sections 42 are more steeply inclined than others. The different forms of the wall sections 42 also results in each outlet opening 22 being offset to one side of the cone 20, and by orienting the central outlet cone 20 in each group at 180° to the other cones in the group, the outlet openings 22 may be aligned with the respective conveyor conduit 24,26.

From each opening 22, a section of heavy wall pipe 46 leads through the volume 39 and the pressure vessel wall, through the slide valve 23 and a curved pipe section 48, into the respective conveyor conduit 24, 26. The pipe 46 and conduits 24, 26 are of the same diameter, which is larger than the diameter of the conduit 24, 26 upstream and downstream of the section where the pipes 46 and conduits 24, 26 converge.

An air compressor 50 provides a supply of conveying air via appropriate valves and orifice plates to the upstream end of the conduits 24, 26, and also to an injection port in the conduit 28. The compressor 50 also supplies air to the upper end of the vessel 12, via the compressed air line 56.

Figure 5:
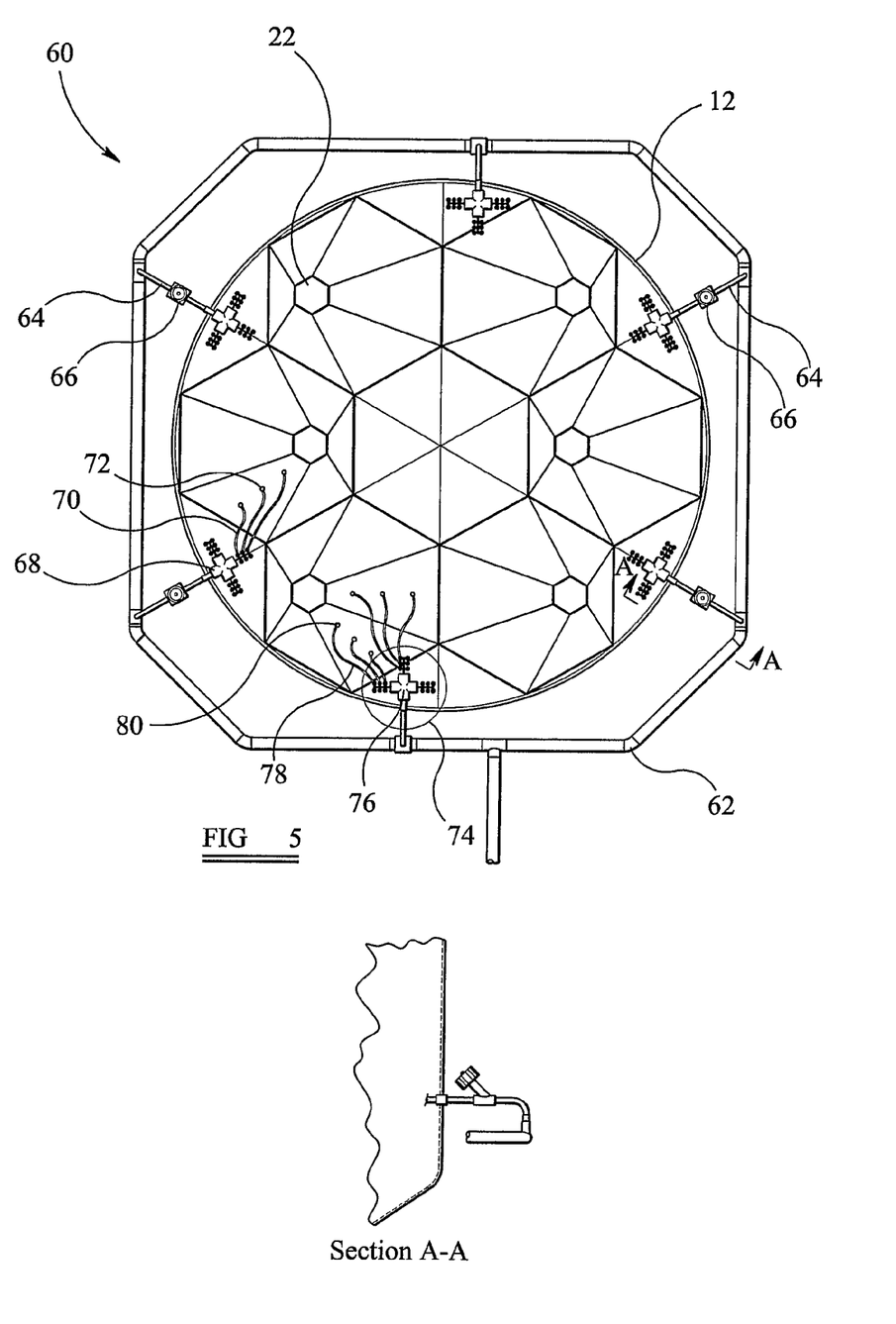
FIG. 5 is a schematic illustration of the agitation arrangement of the system of FIG. 1.

Furthermore, as shown in greater detail in FIG. 5, the compressor 50 supplies air to a cuttings agitator arrangement 60 comprising a ring main 62 and six discharges 64 fitted with pilot valves 66. The discharges 64 each comprise a manifold 68 which distributes the air from the discharge 64 into hoses 70 leading to drilled holes 72 in the outlet cone wall sections 42. The holes 72 may be provided with non-return valves to prevent cuttings from passing into the hoses 70. A further discharge 74 from the ring main 62 supplies air via a manifold 76 and hoses 78 to drilled holes 80 in the central inverted cone 18. Although the flow of air from the holes 72,80 does not fluidize the cuttings, the air jets cut through the body of cuttings, fragmenting the otherwise unitary mass of cuttings, facilitating relative movement between cuttings in different areas of the vessel and thus facilitating movement of the cuttings towards the outlets 22.

In use, the vessel 12 will be filled with drill cuttings as these are produced by a drilling operation. From time-to-time the vessel 12 will be emptied, following the procedure described below.

Initially, the vessel 12 is opened to atmosphere via the vent line 38 while air is supplied from the compressor 50 to all of the agitator holes 72, 80. This will break up and agitate the cuttings that have settled in the vessel above the base member 16. After an appropriate degree of agitation the vent line valve is closed such that the pressure within the vessel 12 then rises to, for example, 6 bar (the air is supplied to the agitator arrangement 60 at 7 bar). Five of the valves 66 are then closed, such that agitation air is now only being supplied to one of the outlet cones 20 and the inverted cone 18. Also, the compressed air line 56 is opened such that compressed air is supplied directly, at 6 bar, to the upper portion of the vessel 12, above the cuttings.

Air is also supplied to the conveyor conduit 24, 26, at 5 bar, which will receive cuttings from the outlet cone 20 which is still being supplied with agitation air. The slide valve 23 of this cone 20 is then opened for 5 to 10 seconds such that a volume or slug of cuttings passes through the pipe and into the conduit 24, 26. Of course gravity assists in moving the cuttings downwardly, however the nature of cuttings is normally such that it is by no means certain that gravity alone would push the cuttings from the vessel 12. Thus, the agitation air and the pressure force acting downwardly on the surface of the body of cuttings from the top of the vessel 12 assist in, respectively, rendering the cuttings more mobile and pushing the cuttings from the vessel 12. Also, the provision of six outlet cones 20 allows the walls of the cones to be relatively steep; providing walls of comparable steepness in a single outlet vessel would be impractical.

On the slug of cuttings passing into the conduit 24, 26, the compressed air will push the slug through the conduits 24, 26, 28 to the intended destination, which may be a similar system mounted on a supply boat.

After being closed for 5 to 10 seconds, the valve 23 is opened again to allow another slug to pass into the conduits 24, 26, 28, and the cycle of opening and closing the valve 23 may continue for several minutes, before switching to another cone 20, and the cycle being repeated for this cone 20, and then each cone 20 in turn.

This cycle is effective in removing all of the cuttings from the vessel 12, the level of cuttings in the vessel 12 tending to decrease fairly evenly, while avoiding rat holing. Also, the release of the cuttings in discrete slugs facilitates movement of the cuttings through the conveyor 14, and testing has demonstrated that cuttings may be conveyed without difficulty through a 40 meter vertical loop or a 100 meter horizontal loop.

The timing of the valve opening sequence may be varied depending on the nature of the cuttings, shorter valve opening times being used for heavier or less mobile cuttings.

For use in offshore environments the vessel 12 will typically be mounted within a frame of standard ISO container dimensions. Accordingly, the vessel has a maximum dimension of 6.1 meters (20 feet). By virtue of the multiple outlet configuration, a vessel having a cubic capacity of up to approximately 22.5 m may be located within these frame dimensions, as opposed to the 15 m cubic capacity of a comparable existing single cone vessel.

Figure 6:
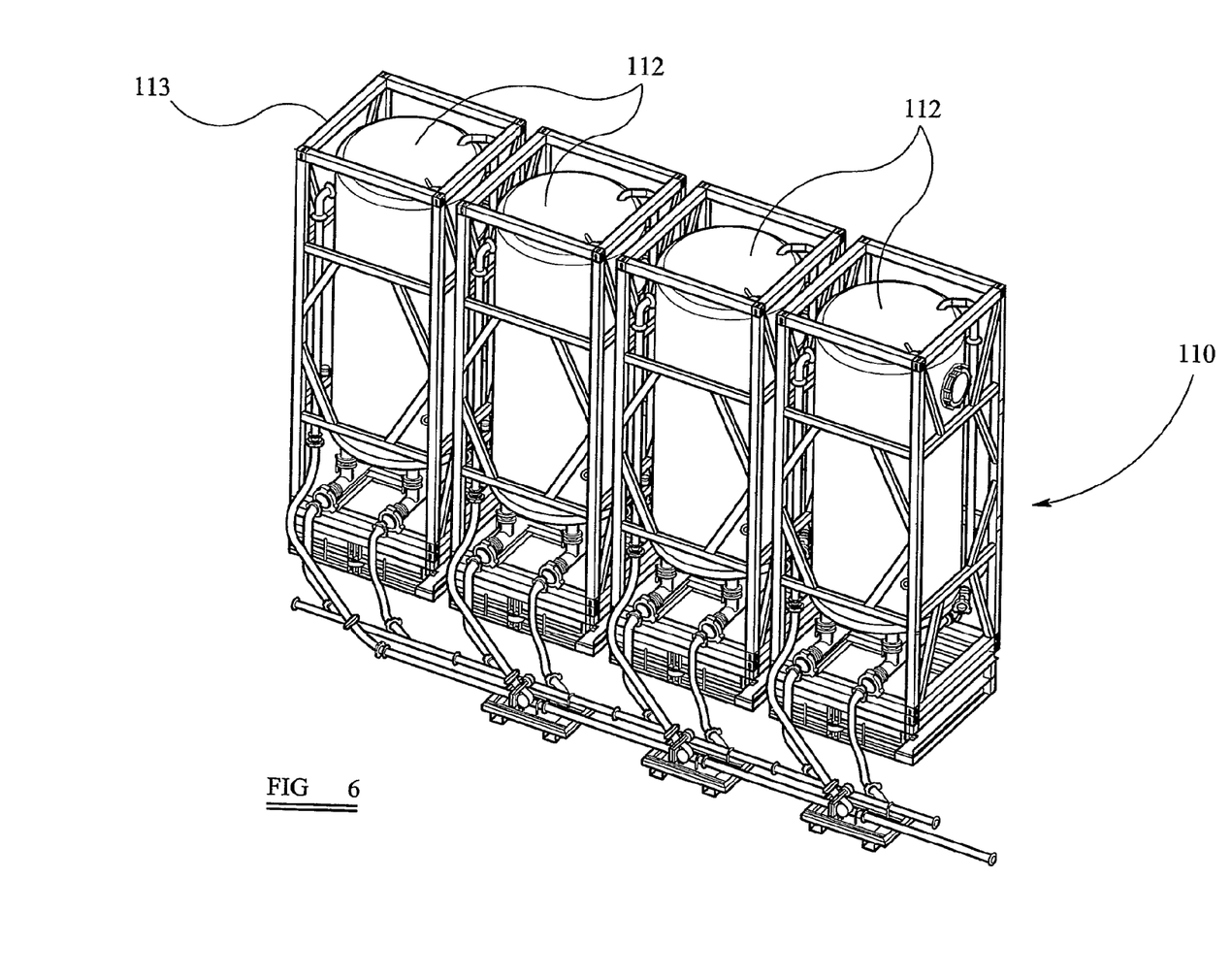
FIG. 6 is a perspective view of a drill cuttings and storage and conveying system in accordance with a preferred embodiment of the present invention, featuring four pressure vessels mounted in ISO frames.

Reference is now made to FIG. 6 of the drawings, which is a perspective view of a drill cuttings and storage and conveying system 110 in accordance with a preferred embodiment of the present invention. The system is intended for offshore application and features four pressure vessels 112 mounted in respective ISO frames 113. The operation and use of each pressure vessel 112 and the associated valving and pipework is substantially the same as the system 10 described above, however the systems are configured such that the pressure vessels and selected pipework and valving are mounted within the perimeter of a respective frame 113, ready for coupling to associated external cuttings conveying pipework and pneumatic supply and control hoses.

Figure 7:
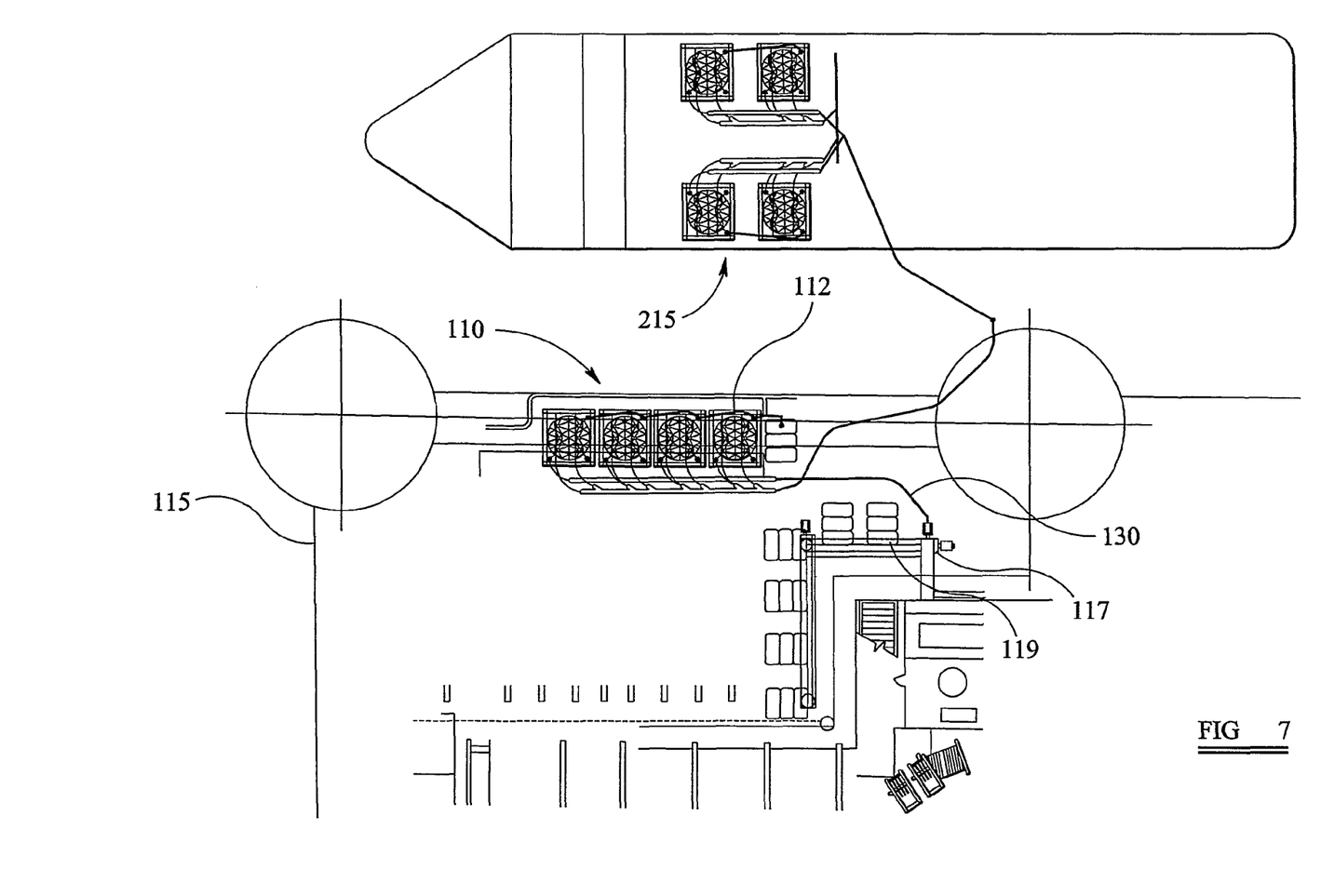
FIG. 7 is a schematic plan view of the system of FIG. 6, mounted on a drilling platform and with the system connected to a further system in accordance with an embodiment of the present invention mounted on a barge.

An example of the location and connection of the system 110 when provided on a drilling platform is illustrated in FIG. 7 of the drawings. The system 110 is located at an edge of the platform 115 and is coupled by a filling hose 130a to a conventional cuttings transporter arrangement 117 utilized to transfer cutting from cuttings shakers 119 to a selected pressure vessel 112. As will be described, the pressure vessels 112 are periodically emptied by conveying the cuttings to a similar, barge-mounted system 215.

Figure 8:
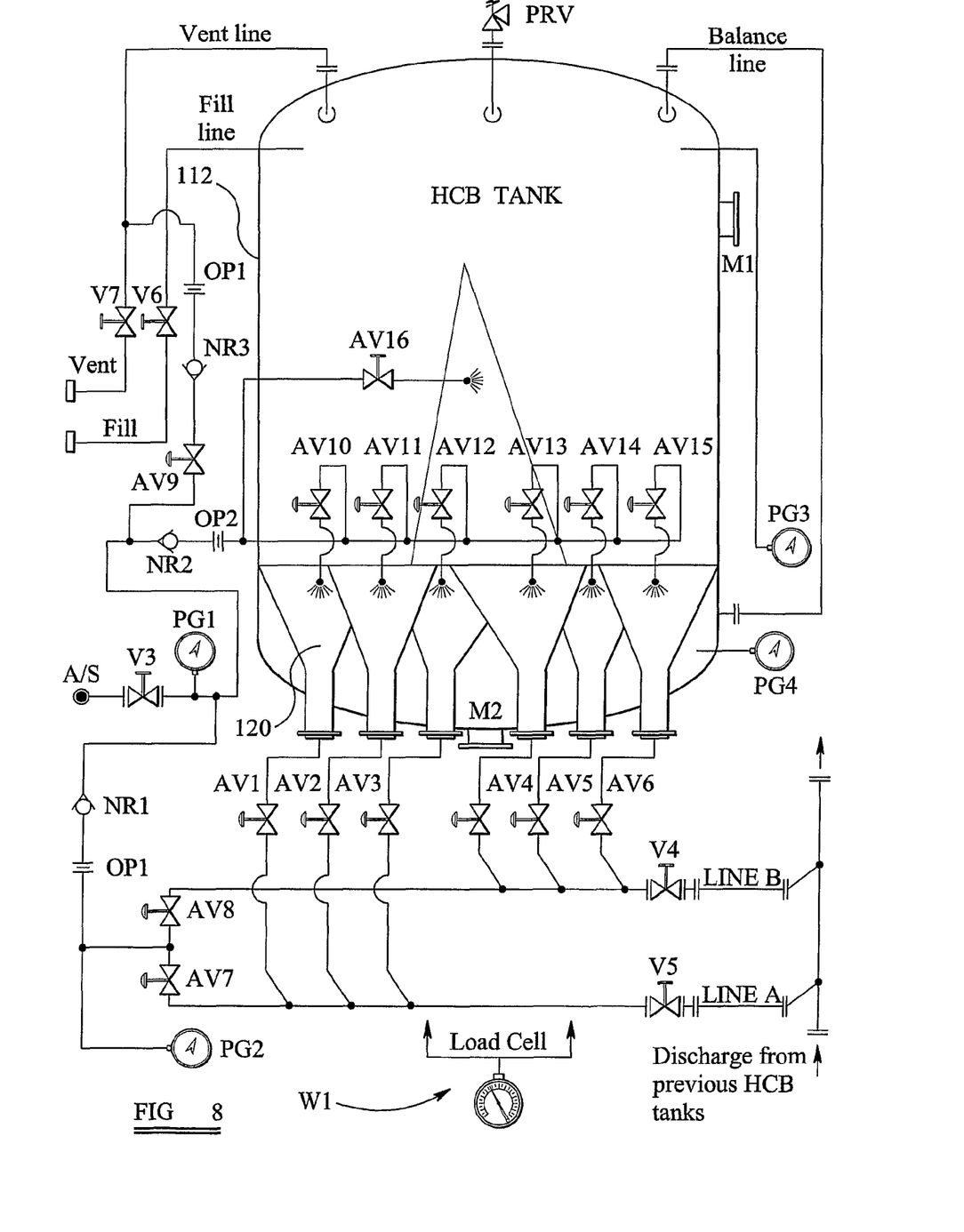
FIG. 8 is a process flow diagram for one of the pressure vessels of FIG. 6.
Figure 9:
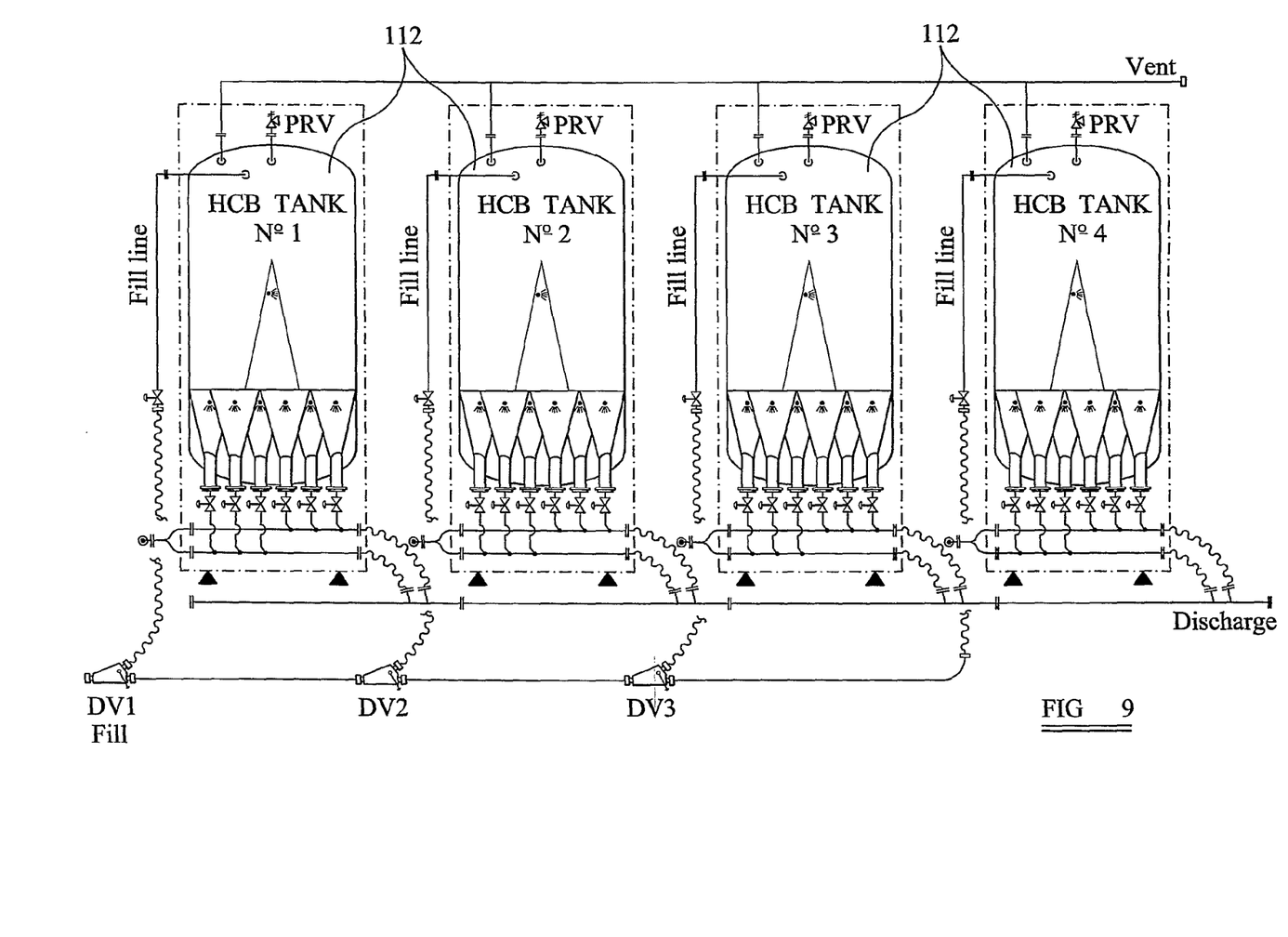
FIG. 9 is a process flow diagram for the four pressure vessels of FIG. 6.
Figure 10:
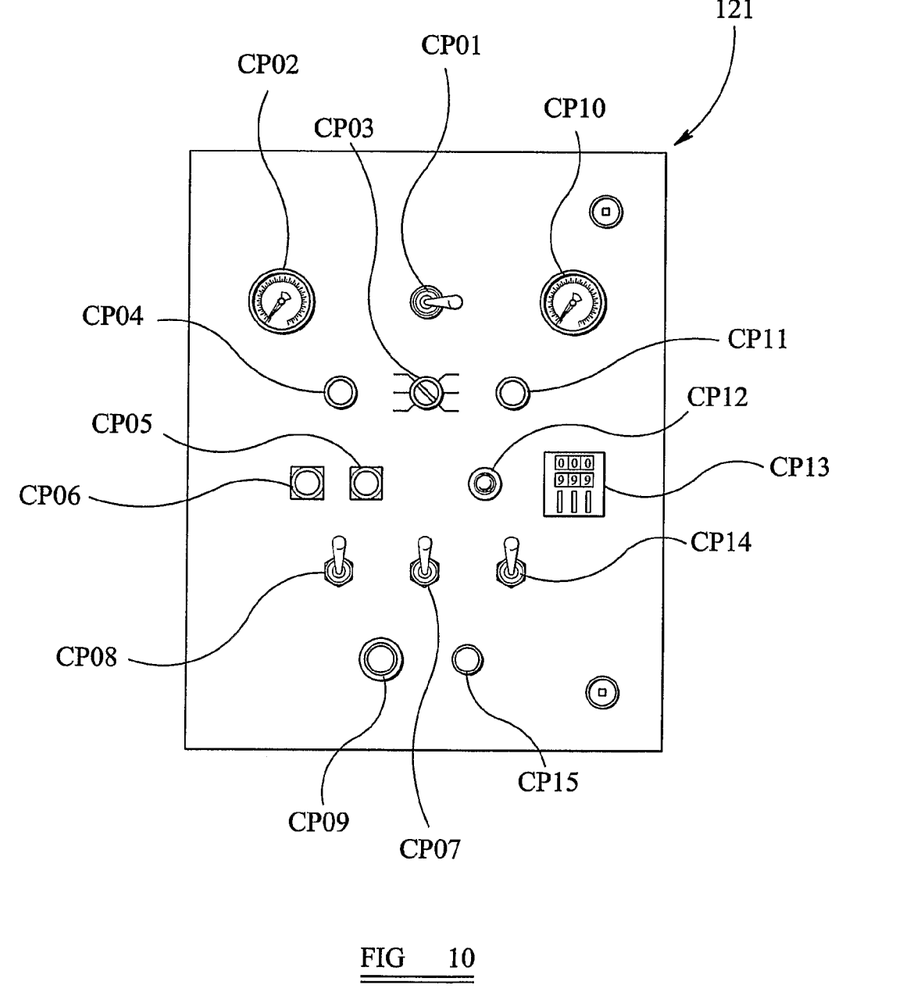
FIG. 10 is a front elevation of a control panel forming part of the system of FIG. 6.

Reference is now also made to FIG. 8 of the drawings, which is a process flow diagram for one of the pressure vessels 112, and also to FIG. 9, a process flow diagram for the four pressure vessels 112, and to FIG. 10, a front elevation of a control panel 121 forming part of the system 110, a control panel being associated with each pressure vessel 112. All switches and controls operated from the control panel are, in this example, pneumatic. In other embodiments only a single control panel may be provided, to be moved between and connected to a selected pressure vessel as required.

The filling of a pressure vessel 112 from the cuttings transporter 117 is achieved as follows. Each vessel 112 is mounted on a respective load cell W1, the load cell readout being provided directly below the operator control panel 121. The vessel 112 will initially be empty or partly empty, and the respective load cell gauge will read less than, for example, 5000 kg. The vessel 112 is at atmospheric pressurize, such that the pressure gauge PG3 will read 0 bar (unless otherwise stated all pressures are "gauge"). The valves V6 and V7 are then opened by setting switch CP07 on the control panel 121 to "Fill Start". The vessel 112 may thus be vented through the vent line 138 and an attached flexible hose to a safe area, such as an empty drill cuttings skip, and the fill line 130 is connected to the filling hose 130a from the cuttings transporter 117. As noted above, valves V6 and V7 are fully open, however all other manual valves and automatic valves are in the normally closed position.

The cuttings transporter 117 may then be operated to transfer cuttings to the vessel 112. During the filling operation, the system operator monitors the load cell reading W1. When the reading W1 equals reaches 25000 kg, indicating that the vessel is filled, the system operator will signal to the cuttings transporter operator to stop the filling operation, or will operate the appropriate diverter valve DV1-3 (FIG. 9) to direct the cuttings to another vessel. If the cuttings are to be directed to another vessel the cuttings transporter stops transporting cuttings for a time, for example 30 seconds, and during this time blows air only through the filling hose 130a in order to clear the line, before changing the diverter valve position to direct cuttings to the next vessel to be filled. Once this change over is complete, switch CP07 on the control panel is set to "Fill Stop", such that valves V6 and V7 close.

Drill cuttings may be stored within the vessel 112 for the required time until discharged to a barge, or until the cuttings are required for a cuttings re-injection procedure (CRI).

The vessel emptying procedure will now be described, which procedure is generally similar whether a platform mounted vessel is being emptied to another vessel on the barge along side the platform or to supply a CRI procedure on the platform, or a barge-mounted vessel is being emptied to a vessel on another platform or treatment plant on land.

At the beginning of the emptying procedure, valves V6 and V7 are closed, manual valves V3, V4 and V5 are fully open, while all of the automatic valves (AVs) are in the normally closed configuration.

The compressed air line providing the air supply for cuttings conveying is connected to the system, as are the instruments on the control panel 121. The compressor is then run up to full operating pressure, as indicated on pressure gauge PG1. The discharge conveying hose or pipe is connected to the vessel and all conveying pipework and hoses are installed in the correct manner for safe conveying of the drill cuttings to the reception point, in this case one of the barge-mounted vessels.

The operator selects "Air to Base" "On" with switch CP08 on the control panel. This opens automatic valves AV10-16 to inject air into the tank base, stimulating knifing and breaking up the stored drill cuttings. This operation is continued for perhaps 3 minutes. The flow of air into the pressure vessel increases the internal vessel pressure, as indicated on pressure gauges PG3 and PG4. To increase the rate of vessel pressurization, the operator may select "Tank Pressure Increase" CP14 on the control panel. This opens automatic valve AV9, to add air directly to the top of the vessel and provides for quicker pressurization of the vessel.

Once the vessel reaches the required pressure of 6 bar, the operator deselects "Air to Base" and "Tank Pressure Increase", setting the respective switches CP08, CP14 to "Off" and "Stop" respectively.

The operator then selects "Line A" using the discharge line selector CP01 on the control panel. This opens conveying air valve AV7, providing airflow through the discharge line which communicates with discharge valves AV1-3. The discharge/conveying line A is now ready to receive drill cuttings from the vessel.

Using the adjustable timers CP06, CP05 on the control panel the operator then sets the "Time Open" CP06 to 5 to 10 seconds and the "Time Closed" CP05 to 20 seconds. The "Discharge Counter" CP 13 is set to 30 counts. The operator then turns the discharge valve selector knob CP03 to AV1. The "Start" button CP11 is then pressed, which starts the valve AV1 cycling for 30 counts. While the valve AV1 is cycling the valve AV10 remains opens, such that air is being passed into the base directly above the valve AV1, breaking up the cuttings directly above the opening valve and maintaining the pressure in the vessel. Valve AV1 will open for the selected period, for example 5 seconds, and during this time a slug of drill cuttings will pass through the open valve AV1 into the discharge line A. The valve AV1 then closes for the selected period, for example 20 seconds. While the valve AV1 remains closed the cuttings slug is pushed through the discharge line, towards the vessel on the barge. The valve timing will be set to provide sufficient time for a slug of predetermined length to pass through the open valve and the resulting slug then to be conveyed through the discharge line to the receiving vessel on the barge. It is preferred that the slug substantially maintains its form as it passes through the discharge line, but also that the slug is not so long as to be difficult to convey. By testing, or from prior knowledge or experience, the optimum slug length may be determined by the operator. Also, as the passage of a slug through the discharge line is marked by a drop in conveying air pressure on gauge PG2, the time for a slug to pass through the conveying line may be determined by the operator beforehand. This testing may be accomplished by initially setting the discharge counter CP13 to "1" and creating and then discharging one slug through the line.

Thus, during the first valve AV1 cycle, 30 individual slugs of drill cuttings will be removed from the vessel through the valve AV1 and conveyed to the barge. While the valve AV1 is cycling a green "Discharging" light CP12 is illuminated. At the end of the cycle the light CP12 is extinguished and the discharge counter CP13 resets. The other valves, AV2 and AV3, on the selected discharge line are then selected in turn, pressing the "Start" button CP11 initiating the cycle for each valve.

The operator next selects discharge "Line B" with discharge line selector CP01, and sets "Discharge Valve Select" CP03 to AV4. This has the effect of closing valve AV7 and opening valve AV8, redirecting the conveying air through the discharge line B. On the operator pressing the "Start" button CP11, the valve AV4 starts cycling for 30 counts, which process is then repeated for the valves AV5 and AV6.

During the discharge sequence the operator monitors a number of conditions. If during conveying the conveying pressure, as displayed on pressure gauge PG2 ("Conveying Pressure" gauge CP02 on the control panel), reaches a predetermined high point of, for example, 6 bar, this may indicate a blockage or overloading of the discharge line. In this event, the "Stop" button CP04 should be pressed, which closes any open discharge valves AV1-6. Once the conveying pressure drops to, for example 3.5 bar, this indicates that the blockage has been cleared (that is, any cuttings slugs in the discharge line have reached the destination vessel), after which the discharge sequence may recommence on the last discharge valve, which is opened by pressing the "Start" button CP11.

If, during the above discharge sequence, tank pressure (as displayed on PG3, PG4 or "Tank Pressure" gauge CP10 on the control panel) drops to, for example 4 bar, the operator selects "Tank Pressure Increase" using switch CP14. This opens valve AV9, allowing the tank pressure to rise relatively quickly to, for example, 6 bar, after which the Tank Pressure switch CP14 can be set to "Stop".

During the discharge sequence the load cell indicator W1 provides an indication of the weight of the vessel, and thus indicates the cuttings level in the vessel. When the indicator W1 reading falls to, for example 2000 kg, this is the level at which only the six hexagonal hoppers or cones 120 in the base of the vessel contain drill cuttings. At this stage it will take approximately 40 seconds to empty each individual hopper section.

As one of the hexagonal hopper sections empties there will be a surge of compressed air from the vessel through the respective discharge valve AV1-6. This will increase the air volume along the discharge line and result in a rapid decrease of pressure in the emptying vessel, which will be evident from pressure gauges PG3, PG4 and CP10. When this occurs the "Stop" button CP04 is pressed and the next discharge valve is selected. This is repeated for all of the discharge valves AV1-6, after which the conveying/discharge air supply is maintained for a time, for example 3 minutes, until the conveying pressure, as indicated on pressure gauges PG2 and CP02, drops to below 1 bar, indicating that the discharge line is clear of cuttings.

As an alternative to this final emptying sequence, it may be acceptable to leave, for example, 2000 kg of drill cuttings in the vessel, as a plug, preventing the air surge as described above.

After the vessel has been emptied, the operator ensures all of the discharge valves AV1-6 are closed, and that all of the agitating air supply valves AV10-16 are closed. The discharge air valves AV7 are AV8 closed, as is valve V3. The vessel is now available for refilling.

Reference is now made to FIGS. 11 to 14 of the drawings which show different forms of pressure vessel, in accordance with alternative embodiments of the present invention.

Figure 11:
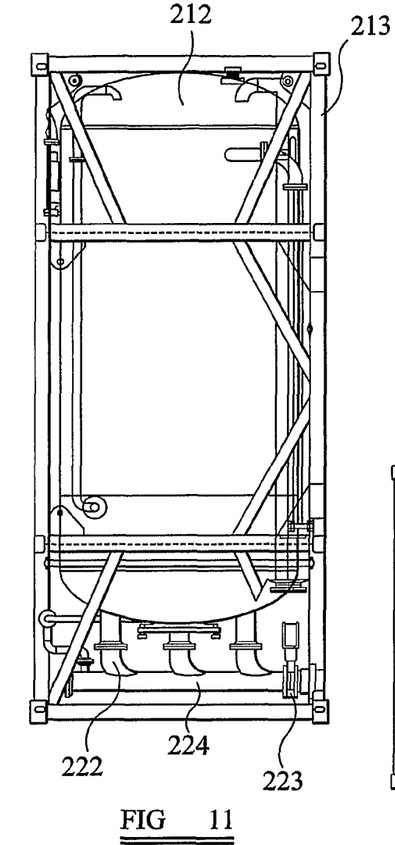
FIGS. 11 to 14 show different forms of pressure vessel in accordance with alternative embodiments of the present invention.

FIG. 11 is an elevation of a pressure vessel 212 mounted in an ISO frame 213 and is substantially similar to the pressure vessel 112 described above. However, rather than providing each outlet opening 222 with a respective slide valve 223, in this embodiment the outlet openings 222 are permanently open, with a discharge controlling valve 223 only being provided in association with each respective conveyor or discharge conduit 224 (only one illustrated in FIG. 11). In emptying this vessel 212, the size of slug which is discharged at each time is controlled by the timing of the opening of the discharge slide valves 223. Also, by selectively supplying air to the cuttings agitating openings associated with a particular cone or hopper 220, it is possible to induce flow through a selected opening 222.

The main advantage of this arrangement is that it reduces the number of slide valves that must be provided and maintained.

Figure 12:
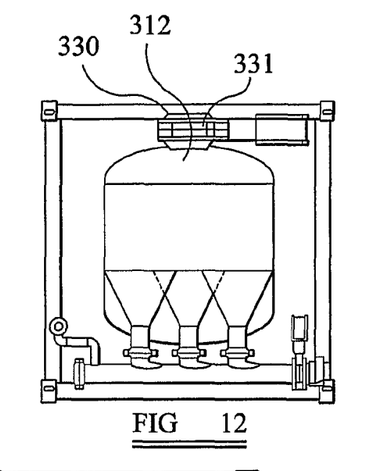

Reference is now made to FIG. 12 of the drawings, which illustrates a smaller pressure vessel 312 in accordance with a further embodiment of the present invention. In particular, the illustrated vessel 312 has a capacity of 600 liters, and is intended for batch transfer of drill cuttings. Such a vessel 312 may simply be filled through a valve controlled upper fill port 330 provided with a slide valve 331. The filled vessel 312 may then be transported, and subsequently emptied in a similar manner to the vessels described above.

Other vessels useful for batch transfer of drill cuttings could have a capacity between 100 and 1000 liters.

Figure 13:
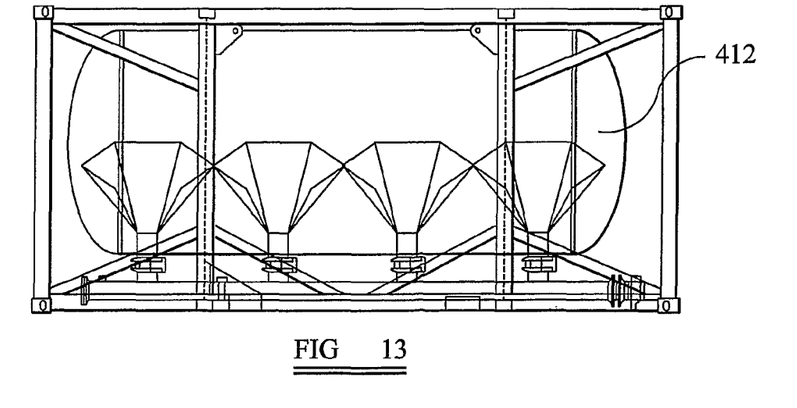
Figure 14:
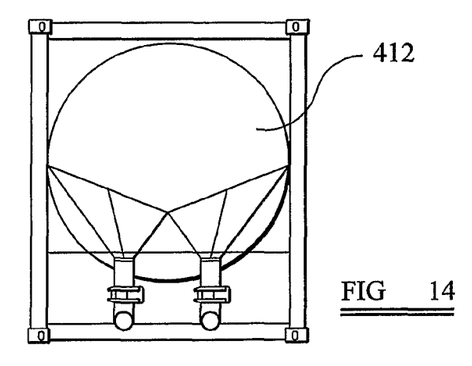

Finally, reference is made to FIGS. 13 and 14 of the drawings, which illustrate a pressure vessel 412 which is adapted to lie in a horizontal orientation. Such a vessel 412 may be utilized where the size of the footprint of the vessel is of less importance, or it is desired to provide a lower-height vessel. Furthermore, the horizontal orientation of the vessel 412 also provides for greater stability, facilitating transport, particularly by road or rail.

It will be apparent to those of skill in the art that the above-described embodiments are merely exemplary of the present invention and that various modifications and improvements may be made thereto without departing from the scope of the invention.

What is claimed is:

1. A drill cuttings storage and conveying system comprising:
a pressure vessel for containing drill cuttings including a base member integral with the pressure vessel wherein the base member defines a plurality of drill cuttings outlets disposed about an inverted cone extending from the base member inwardly into the pressure vessel and a plurality of agitation fluid outlets for directing fluid into the cuttings to facilitate-movement of the cuttings towards the drill cuttings outlets; and a drill cuttings conveyor in communication with the drill cuttings outlets for carrying drill cuttings from the vessel, wherein each drill cuttings outlet is provided at the bottom of an outlet cone integral with the base member and extending outwardly from the pressure vessel and wherein the outlet cones have a hexagonal form.

* * * * *